United States Patent
Boross et al.

(10) Patent No.: US 10,146,821 B2
(45) Date of Patent: Dec. 4, 2018

(54) METHOD AND SYSTEM FOR SORTING AND DISPLAYING DATA

(71) Applicant: Oracle International Corporation, Redwood Shores, CA (US)

(72) Inventors: Diane Boross, Belmont, CA (US); Laurence W. Becker, Mountain View, CA (US); Anupama Ramesh, Foster City, CA (US); Shirphone Kuo, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 443 days.

(21) Appl. No.: 14/968,806

(22) Filed: Dec. 14, 2015

(65) Prior Publication Data

US 2016/0110397 A1   Apr. 21, 2016

Related U.S. Application Data

(63) Continuation of application No. 13/035,914, filed on Feb. 25, 2011, now Pat. No. 9,244,989.

(51) Int. Cl.
 *G06F 17/30* (2006.01)

(52) U.S. Cl.
 CPC .. *G06F 17/30339* (2013.01); *G06F 17/30554* (2013.01); *G06F 17/30572* (2013.01)

(58) Field of Classification Search
 CPC ................................................. G06F 17/30554
 See application file for complete search history.

(56) References Cited

U.S. PATENT DOCUMENTS

| | | | |
|---|---|---|---|
| 5,884,306 A | 3/1999 | Bliss et al. | |
| 7,162,471 B1 | 1/2007 | Knight et al. | |
| 2007/0214154 A1 | 9/2007 | Ducatel et al. | |
| 2009/0083213 A1* | 3/2009 | Haynes | G06F 17/30091 |
| 2009/0164418 A1 | 6/2009 | Pulnikova | |
| 2009/0187557 A1 | 7/2009 | Hansen et al. | |
| 2010/0223546 A1 | 9/2010 | Liu | |
| 2010/0299343 A1 | 11/2010 | Ahari et al. | |
| 2011/0302177 A1 | 12/2011 | Cottingham et al. | |
| 2012/0042280 A1 | 2/2012 | Hoffman | |

* cited by examiner

*Primary Examiner* — Grace Park
(74) *Attorney, Agent, or Firm* — Trellis IP Law Group, PC

(57) ABSTRACT

A system and method adapted to facilitate efficient sorting and displaying of data in a table. An example method includes displaying a table with a first portion of data and a second portion of data; simultaneously applying a first sort rule to the first portion of data (primary database object(s)) and a second sort rule to the second portion of data (secondary database object(s)) in response to user selection of a sort option; and illustrating sorted data via the table, wherein the first sort rule is adapted to cause the first portion of data to appear in one or more predetermined locations in the table relative to the second portion of data. The second portion of data is sorted according to the second sort rule. In a more specific embodiment, primary database objects are sorted via the first sort rule and are not subject to the second sort rule. The first sort rule includes a specification that primary database objects be displayed at a predetermined location in the table, such as in an uppermost position in the table or in an upper most position in a purpose group section of the table.

19 Claims, 17 Drawing Sheets

|  | ┌─32 | ┌─34 | ┌─36 |
|---|---|---|---|

Sort | Sort Options ▽ | Group Filter Options ▽

Purpose Group (Category) 1:
| Primary Object 1A (also called Primary Row Item 1A) — 40 |
| Secondary Object 1A — 42 |
| Secondary Object 1B — 44 |
| Secondary Object 1C — 46 |

Fig. 2

| | | 50 |
|---|---|---|
| | ┌─32─┐ ┌─34──────┐ ┌─36──────────────┐ | |
| | ( Sort ) │ Sort Options ▽│ │ Group Filter Options ▽│ | |
| | ┌─38 78 | |
| Purpose Group 1: ─40 | | |
| | Primary Object 1A | |
| 72 → | | Secondary Object 1A ─ 42 |
| | | Secondary Object 1B ─ 44 |
| | | Secondary Object 1C ─ 46 |
| Purpose Group 2: ─ 58 | | |
| | Primary Object 2A ─ 60 | |
| 74 → | | Secondary Object 2A ─ 52 |
| | | Secondary Object 2B ─ 54 |
| | | Secondary Object 2C ─ 56 |
| Purpose Group 3: ─ 68 | | |
| | Primary Object 3A ─ 70 | |
| 76 → | | Secondary Object 3A ─ 62 |
| | | Secondary Object 3B ─ 64 |
| | | Secondary Object 3C ─ 66 |

Fig. 3

| | | 120 |
|---|---|---|
| Sort (32) | Sort Options (34) | Group Filter Options (36) |

Purpose Group 1: (38) (40)
| Primary Object 1A | |
|---|---|
| | Secondary Object 1A — 42 |
| | Secondary Object 1B — 44 |
| | Secondary Object 1C — 46 |

72 ↰

Purpose Group 3: (68) (70)
| Primary Object 3A | |
|---|---|
| | Secondary Object 3A — 62 |
| | Secondary Object 3B — 64 |
| | Secondary Object 3C — 66 |

| | | |
|---|---|---|
| | Sort | Sort Options | Group Filter Options |
| Primary Object 1A — 40 | | |
| Primary Object 2A — 60 | | |
| Primary Object 3A — 70 | | |
| | Secondary Object 1A — 42 | |
| | Secondary Object 2A — 52 | |
| | Secondary Object 3A — 62 | |
| | Secondary Object 1B — 44 | |
| | Secondary Object 2B — 54 | |
| | Secondary Object 3B — 64 | |
| | Secondary Object 1C — 46 | |
| | Secondary Object 2C — 56 | |
| | Secondary Object 3C — 66 | |

Fig. 6

| | | 140 |
|---|---|---|
| | 32 34 36 | |
| | ( Sort ) [ Sort Options ▽ ] [ Group Filter Options ▽ ] | |
| | 158 | |
| | Purpose Group 1: ~38 | |
| 72 | Primary Object 1A ~40 | |
| | Secondary Object 1A ~42 | |
| | Secondary Object 1B ~44 | |
| | Sub-Purpose Group B: ~148 | |
| 164 | Tertiary Object 1Ba ~142 | |
| | Tertiary Object 1Bb ~144 | |
| | Secondary Object 1C ~46 | |
| | Sub-Purpose Group C: ~158 | |
| 166 | Tertiary Object 1Ca ~152 | |
| | Tertiary Object 1Cb ~154 | |

Fig. 7

| Actions ⌄ View ⌄ Format ⌄ | | | |
|---|---|---|---|
| Primary | Name | Primary Phone | Title |
| | Jack Jones / Primary contact | (123)564-1155 | Purchasing Manager |
| | Jeremy Jones | (123)564-1144 | Purchaser |
| | Jocelyn Jones | (123)564-1133 | Head Purchaser |
| | Joseph Jones | (123)564-1122 | Purchasing Manager |
| | Joshua Jones | (123)564-1166 | Purchaser |
| | Juda Jones | (123)564-1188 | Head Purchaser |
| | | (123)564-1199 | Purchaser |

| Actions ˅ View ˅ Format ˅ | 🗎 ✏ ✖ 🖼 | 🔲 Freeze | ⬇ Wrap | Purposes | Ship To ˅ |
|---|---|---|---|---|---|
| Primary | Purpose | Address | | | |
| | Ship To | 500 Oracle Parkway | | | |
| | Ship To | 200 Oracle Parkway | | | |
| | Ship To | 300 Oracle Parkway | | | |

FIG. 16

Center for Disease Control Customer Details

Profile | Organizational Chart

Customer Name: Center for Disease Control
Primary Phone: (123) 456-7890
Contact: Susan Smith
Phone: (123) 789-0000
☑ Primary Contact ~274

Account Number: 123456
Address: 123 3rd St San Mateo, CA
URL: http://www.cdc.gov/
Annual Revenue: 10,000,000 USD
DUNS: 50-551-7508

METHOD AND SYSTEM FOR SORTING AND DISPLAYING DATA

CROSS REFERENCES TO RELATED APPLICATIONS

This application is a continuation of the following application, U.S. patent application Ser. No. 13/035,914, entitled SETTING AND DISPLAYING PRIMARY OBJECTS FOR ONE OR MORE PURPOSES IN A TABLE FOR ENTERPRISE BUSINESS APPLICATIONS, filed on Feb. 25, 2011, which is hereby incorporated by reference, as if it is set forth in full in this specification:

BACKGROUND

This application relates in general to software and more specifically to systems, methods, and user interfaces for facilitating the display and sorting of items in tables.

Methods for displaying data in database tables are employed in various applications including Customer Relationship Management (CRM), Supply Chain Management (SCM), Project Management (PM), general Enterprise Resource Planning (ERP) applications, and so on. Such applications often demand efficient mechanisms for navigating, searching for, displaying, and sorting data.

For the purposes of the present discussion, a database may be any organized collection of data, wherein data is organized via database objects (also called items), such as tables, records, rows, and so on. Data in a database may be grouped into various objects (e.g., tables) and sub-objects (e.g., rows and fields in a table), where the sub-objects are also called objects herein. An example database includes various data groupings in accordance with purposes associated with the different groupings. For example, in a database that tracks product sales, one table may contain records associated with "ship to" addresses; another table may contain "bill to" addresses; another table may include "sold to" addresses. In the example database, each table includes a primary record, representing a record associated with a highest priority. For example, in a table illustrating a set of "ship to" addresses, one of the shipping addresses may be considered the primary shipping address. The primary shipping address may be, for example, the shipping address that is most frequently used.

Each table in the example database may be sortable via one or more sort rules, also called sorting rules or sorting criteria. For example, records (e.g., fields, rows, or columns) in a given table may be sorted by alphabetical order. In this case, the applied sort rule is said to be an alphabetical sort rule.

Conventionally, to view and sort data from multiple tables associated with multiple different purposes (e.g., purpose groups) or categories, each table is opened and sorted separately. However, the opening of multiple tables and associated windows may be time consuming and may require excessive use of computing resources. Furthermore, sorting of the tables may cause the primary records to be sorted along with other records in the tables, thereby potentially making the primary records less visible within the tables. This may inhibit users from rapidly and efficiently arranging, viewing, and accessing desired data.

SUMMARY

An example method for facilitating efficient display and sorting of data includes displaying a table with a first portion of data and a second portion of data; simultaneously applying a first sort rule to the first portion of data and a second sort rule to the second portion of data in response to user selection of a sort option; and illustrating sorted data via the table, wherein the first sort rule is adapted to cause the first portion of data to appear in one or more predetermined locations in the table relative to the second portion of data, and wherein the second portion of data is sorted according to the second sort rule.

In a more specific embodiment, the first sort rule is characterized by a higher sorting priority than the second sort rule such that data that is subject to the first sort rule is not subject to the second sort rule, but displayed data that has been sorted via the second sort rule may be positioned in the table in accordance with both the first sort rule and the second sort rule. The first sort rule specifies that data sorted by the first sort rule is displayed at a predetermined prominent position in the table, such as in the uppermost position, e.g., top row(s).

The first portion of data includes one or more database objects that are designated as primary database objects. The sorted data includes data organized into one or more sections (also called stacks) corresponding one or more purpose groups. The one or more primary database objects are associated with, i.e., belong, to one or more purpose groups. The second portion of data includes one or more database objects other than primary database objects, where the database objects are associated with one or more purpose groups.

Each primary database object that is associated with a purpose group is displayed in a predetermined location within each section of the table. The predetermined location may be an uppermost portion of a section. Row banding, whereby one or more rows are highlighted, outlined, or otherwise graphically altered, may be selectively applied to the table to facilitate visually distinguishing different sections of data in a table or to facilitate visually distinguishing one or more primary database objects from data of the second portion of data. A group filter option enables a selective omission of one or more portions or groups of data from the table of displayed sorted data.

The novel design of certain embodiments disclosed herein is facilitated by mechanisms that enable sorting of data in a table, whereby primary database objects persist in a prominent location, while secondary data is sorted according to another sort rule, such as a default table sort rule.

Furthermore, mechanisms are provided for enabling simultaneous display of data pertaining to multiple purpose groups in a single table. Data from multiple purpose groups may be displayed in a single table, where primary data is automatically positioned at the top of a table; at the top of a purpose group section or stack; or at other predetermined visually prominent locations. Hence, important data can now be readily viewed in a sorted table without the important data being shuffled among less important data. Furthermore, various types of data may be viewed in a single table without the need to open multiple windows and tables to view data from different purpose groups or other categories.

Hence, use of embodiments disclosed herein may enable database application users to readily combine, assign, and visually distinguish multiple primary settings (primary database objects) within one or more purpose groups in a single table. This may greatly expedite viewing, accessing, and sorting data. This may be particularly beneficial for enterprise business applications, where rapid and efficient access to high priority data may save time and reduce business costs.

A further understanding of the nature and the advantages of particular embodiments disclosed herein may be realized by reference of the remaining portions of the specification and the attached drawings.

BRIEF DESCRIPTION OF THE DRAWINGS

FIG. 2 is a diagram of a first example user interface display screen showing a first sorted table with row items (objects) that are part of a purpose group (category), wherein the row items include a primary row item and secondary row items.

FIG. 3 is a diagram of a second example user interface display screen showing a second sorted table with row items associated with multiple purpose groups, wherein each purpose group includes a primary row item.

FIG. 5 is a diagram of a third example user interface display screen showing a third sorted table, where a purpose-group filter has been applied.

FIG. 6 is a diagram of a fourth example user interface display screen showing a fourth sorted table, where primary row items are positioned at an uppermost portion of the table.

FIG. 7 is a diagram of a fifth example user interface display screen showing a fifth sorted table, which includes a primary row item, secondary row items, and tertiary row items associated with a purpose group and sub-purpose groups.

FIG. 11 is a diagram of a sixth example user interface display screen illustrating a example use case involving a table of contacts, i.e., a contacts table with contact objects arranged in rows.

FIG. 14 is a diagram showing the seventh example user interface display screen of FIG. 13 after a purpose filter has been set to display only bill-to contact addresses.

FIG. 15 is a diagram showing the seventh example user interface display screen of FIG. 13 after additional primary objects have been set, and the resulting table rows have been arranged into sorted purpose groups.

FIG. 16 is a diagram illustrating the seventh example user interface display screen of FIG. 15 after selection of a ship-to purpose filter.

FIG. 17 is a diagram of an eighth example user interface display screen illustrating an alternative mechanism for setting a primary object.

DETAILED DESCRIPTION OF EMBODIMENTS

Figure 1:
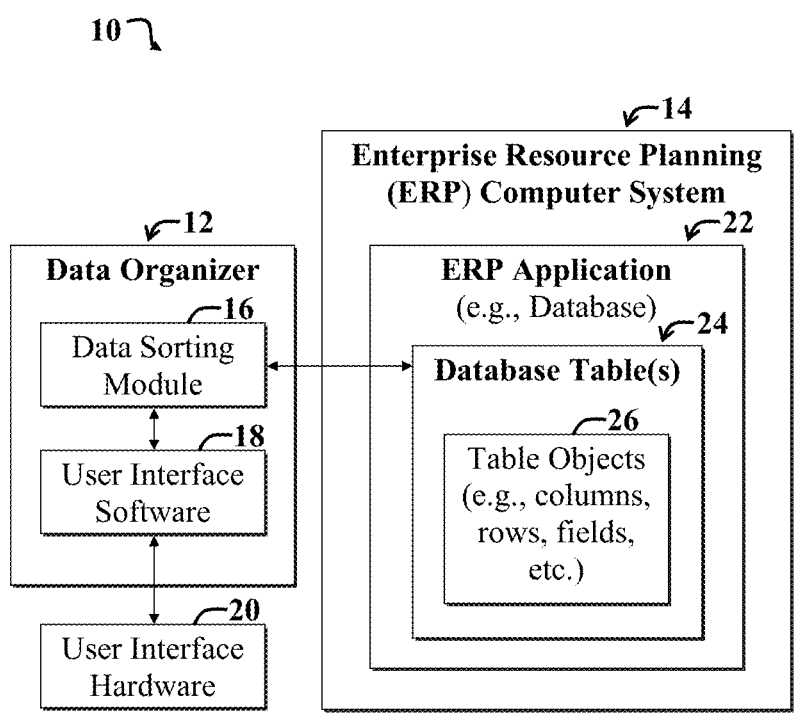
FIG. 1 is a diagram illustrating an example embodiment of a system for facilitating organization of data in one or more database tables of Enterprise Resource Planning (ERP) software.

Although the description has been described with respect to particular embodiments thereof, these particular embodiments are merely illustrative, and not restrictive.

For example, while the present description has been described primarily with respect to sorting and displaying of data in database tables, such as Enterprise Resource Planning (ERP) database tables, embodiments are not limited thereto. For example, certain embodiments discussed herein may be applicable to the display of search engine results or any listing of data. Certain embodiments discussed herein are particularly applicable to listing of data where benefits are derived from grouping the data into different categories or purpose groups, and/or where benefits may be derived from applying different sorting and/or display rules to data belonging to different categories. In general, various software applications that employ a user interface to display data may benefit from the ability to simultaneously apply multiple sorting rules to a list of data, where different sorting rules may apply to different groupings, types, or other categories of data.

In addition, while certain embodiments are discussed with reference to display of data from different purpose groups, embodiments are not limited thereto. For example, the sorting and display of any category of data via a table, not necessarily a purpose group category, may be implemented in accordance with the teachings herein without departing from the scope thereof.

Enterprise software applications, such as Customer Relationship Management (CRM), Business Intelligence (BI), and Enterprise Resource Planning (ERP) software, often include databases with various database objects, also called data objects, items, or entities. A database object may be any collection of data, such as data pertaining to a particular financial account, asset, employee, contact, and so on. Examples of database objects include, but are not limited to, records, tables, rows, columns, or other database entities, such as portions of data corresponding to accounts receivables, products, employees, customers, business resources, and so on. Database objects corresponding to rows or columns are also called row items or column items, respectively. A primary database object, also called a primary item, or a set master or a set preferred object, may be any database object that has been designated to have a predetermined priority that is higher than a priority of one or more other database objects included in a similar group of data as the primary database object. A priority may be any value in a ranking scale that may be used to determine how a database object should be treated or handled by software relative to one or more other database objects.

For the purposes of the present discussion, ERP software may be any set of computer code that is adapted to facilitate managing resources of an organization. Example resources include Human Resources (HR), financial resources, assets, and so on, of an enterprise. The terms "ERP software" and "ERP application" may be employed interchangeably herein. However, an ERP application may include one or more ERP software modules or components, such as user interface software modules or components.

For clarity, certain well-known components, computer operating systems, routers, power supplies, and so on, have been omitted from the figures. However, those skilled in the art with access to the present teachings will know which components to implement and how to implement them to meet the needs of a given application.

FIG. 1 is a diagram illustrating an example embodiment of a system 10 for facilitating organization of data 26 in one or more database tables 24 of Enterprise Resource Planning (ERP) software 22. The system 10 includes a data organizer 12 in communication with an ERP computer system 14 running an ERP application 22, such as a database. The ERP database application 22 includes database tables 24 with various table objects 26, such as columns, rows, fields, records, and so on. The data organizer 12 includes user interface software 18 and a data sorting module 16 in communication with the database tables 24. The user interface software 18 of the data organizer 12 communicates with user interface hardware 20, which may include a computer monitor, keyboard, mouse, and so on.

For clarity, the data organizer 12 is shown separately from the ERP computer system 14. However, the data organizer 12 may run on the same computer as the ERP application 22 and may even be embedded as part of the ERP application 22 without departing from the scope of the present teachings.

In operation, a user employs the user interface hardware 20 to view user interface display screens provided by the user interface software 18. The user interface software 18 facilitates viewing data from one or more database tables 24 of the ERP application 22 and further facilitates strategically sorting the table data and displaying the sorted table data, which includes database objects, as discussed more fully below.

In a first example operative scenario, a user employs the user interface software 18 to view a table that includes data corresponding to a particular purpose group, also called a purpose category or context. For the purposes of the present discussion, a purpose group may be any mechanism for distinguishing data in accordance with an intended use of or purpose of the data. An example purpose category includes a shipping-address category, wherein database objects in the shipping-address category include one or more database objects associated with one or more shipping addresses. A category of data may refer, for example, to a distinguishing label or name applied to a group or collection of data and/or to the data of the group itself.

An example purpose group, such as a shipping-address purpose group, includes a database object (e.g., row item) that has been designated as a primary object. In the present operative scenario, when the table is sorted, e.g., in response to user input supplied via the user interface hardware 20, all database objects (e.g., shipping-address row items) other than the primary object are sorted according to a predetermined table sort rule. The sort rule, which is also called a sort criterion or sort constraint, may specify, for example, that table data (other than primary data) be sorted alphabetically. During the sort, the primary object automatically moves to a predetermined prominent location in the table, such as the topmost row in the table.

Hence, the user interface software includes machine-readable instructions, i.e., computer code, for implementing a table sort based on plural sort rules. In particular, a first sort rule may be applied to primary objects. The first sort rule (also called sorting rule) may specify, for example, that primary objects are moved to the top of the table in response to activation of a sort. The first sort rule may further specify a sorting rule for organizing multiple primary objects relative to each other. A second sort rule, which may be a default table sorting rule, is applied to data that is not primary data (i.e., not a primary object(s)). The second sort rule may specify, for example, that secondary data be sorted alphabetically.

In the present operative scenario, table data that is not primary data, i.e., that does not represent one or more primary objects, is called secondary data, which comprises secondary objects, i.e., secondary row items. The primary objects are said to persist in prominent table locations after table sorting. Exact prominent locations are implementation specific and may be adjusted without departing from the scope of the present teachings. For example, in tables where database objects are arranged in columns, primary objects may move to the left most columns. Alternatively, or in addition, row or column banding may be applied to the primary data and/or the secondary data to facilitate enabling users to rapidly distinguish between primary and secondary database objects. Similar banding or highlighting techniques may be applied to hierarchical representations of data, such as tree hierarchies.

Conventionally, when table data is sorted, any primary objects are sorted according to a single sort rule applied to the table. For example, in the case of an alphabetical sort, the primary object will conventionally be shuffled into alphabetical order with the remaining secondary objects. This may undesirably obscure primary data.

In the present embodiment, in implementations where tables include multiple primary objects, the primary objects may be moved to prominent table location(s), e.g., to a top section of the table, where they may be ordered in accordance with the first sort rule. Multiple primaries for different purpose groups may be included under one purpose without departing from the scope of the present teachings. For example, while a given typically includes one primary purpose-group related object, the given purpose group may or may not coincidentally contain primary objects from other purpose groups.

In an example implementation where table data includes multiple purpose groups of database objects, where each purpose group has a single primary database object, the user interface software 18 may be configured to sort primary and secondary data according to one or more user options. For example, in one configuration, the primary objects are separated from their corresponding purpose groups; moved to the top of the table; and arranged in an order specified via a first sort rule. The secondary data is sorted according to the second sort rule and is displayed in a portion or in one or more sections of the table that is/are below the primary objects.

Hence, object lists, as may be displayed in a table, may contain multiple purposes. One or more primary settings may be assigned to each of the purpose groups (purposes) within a single table, resulting in multiple primary database objects (also called primaries) per table. In a group list with multiple primaries assigned to multiple purposes, all primary-per-purpose assignments may be displayed in the top rows of the table in alphabetical order, or any context specified sorting order, e.g., a default sorting order. Also, multiple purposes can be filtered using a purpose filter to display only one purpose group and one assigned primary at a time, as discussed more fully below.

In another example configuration (of the user interface software 18), the sorted data is displayed partitioned in groups, called stacks, where the top of each group stack is the primary object for that group. The secondary data in each group may be sorted according to the second sort rule, which may be the default sort rule for the table. The groups themselves may be ordered in accordance with the sort order of the primary objects associated with each group, i.e., the first sort rule. For example, if the first sort rule for sorting the primary objects specifies that the primary objects be organized alphabetically, then a sort may result in the purpose groups being positioned relative to each other based on the alphabetical order of the associated primary objects.

Hence, a primary object (also called a primary, master, preferred, primary assignment, primary item, and so on) can be displayed in a by-purpose table which organizes and displays multiple primary objects in multiple purpose groups (also called stacked by-purpose list groups). Each purpose group may default to display the associated primary object in the first row of the purpose group list, i.e., stack list. Secondarily, stacks may be sorted alphabetically, or within a specified context. All secondary sorting may inherit standard or preexisting default table sort behaviors. The primary object may always be displayed, for example, at the top row of each stack. Row banding can be applied to delineate and highlight purpose group stacks within a standard object group list table.

The system 10 may be considered as providing various sorting and display functionality, including a sorting mechanism (e.g., via the data sorting module 16 responsive to user input via the user interface software 18) for assuring that user designated primary object(s) are selectively moved to the highest priority group list location(s) within a single group list or a group list table containing multiple purpose(s) using a strategic grouping organization and mechanism for the display of primary objects/settings in tables.

In summary, in the present example embodiment, a user selected primary item in a group list may sort to the top of the table (or other predetermined prominent table location) and can be reassigned, or reset, through user actions. Primary objects may display in a table with the primary object defaulting to display at the top row of a standard table list. All other row objects in the group list, e.g., secondary objects, may inherit any standard table default sorting behavior as a secondary sorting method (e.g., the second sort rule). For example, after a first table row is reserved for a primary object, all subsequent row items (2, 3, 4 . . . ) might, for example, inherit alphabetical sorting, e.g., if sorting by Contact Name is the specified table default sorting behavior. The primary object row positioning does not necessarily change to inherit the secondary standard table sorting behavior, and therefore, persists in the top row.

FIG. 2 is a diagram of a first example user interface display screen 30 showing a first sorted table 48 with row items (objects) 40-46 that are part of a purpose group (category), labeled 38, wherein the row items 40-46 include a primary row item 40 and secondary row items 42-46.

In the example sorted table 48, the primary row item 40, i.e., object has been sorted to the top of the table 48. Secondary data, representing the secondary objects 42-46, has been sorted alphabetically (A-C) and arranged below the primary object 40, called primary object or primary row item 1A.

For illustrative purposes, the purpose group associated with the objects 40-46 is labeled as a first purpose group 38. The purpose group label 38 may be omitted without departing from the scope of the present teachings.

The example display screen 30 further includes various user interface controls 32-36, including a sort button 32, a sort-options drop-down list 34, and a group-filter-options drop-down list 36. A user triggers a sort of the table 48 by selecting the sort button 32. The nature of the sorting and the display of objects may be controlled via selection of options from the sort-options drop-down list 34 and the group-filter-options drop-down list 36, respectively, as discussed more fully below.

For the purposes of the present discussion, a user interface control may be any graphically displayed feature that is responsive to user selection of the feature or otherwise enables a user to select or interact with functionality afforded by underlying software. Examples of user interface controls include buttons, drop-down lists, checkboxes, fields, radio buttons, and so on.

In an example operative scenario, the sort-options drop-down list 34 provides one or more user options for specifying or otherwise selecting sort rules that affect how the secondary data 42-46 and the primary data 40 is sorted. For example, the secondary data 42-46 may be sorted based on alphabetical order or another prioritization/sorting scheme. The primary data 40 may be automatically moved to a prominent position in the table 48, and various distinguishing features, such as row banding, may be applied. For the purposes of the present discussion, row banding may refer to any highlighting, outlining, or graphical alteration of one or more row features or characteristics.

The group-filter options 36 may provide one or more user options for controlling which purpose groups are displayed in the table 48. For example, while the data accessed by the user interface software 18 of FIG. 1 may include data associated with multiple purpose groups, purpose groups other than the first category 38 may have been filtered from the display screen 30 via selection of a particular group-filter option from the group-filter options drop-down list 36.

Note that the user interface controls 32-36 for interacting with the user interface software 18 of FIG. 1 are illustrative, and more, fewer, and/or different controls than those shown may be used in an implementation without departing from the scope of the present teachings.

FIG. 3 is a diagram of a second example user interface display screen 50 showing a second sorted table 78 with row items 40-46, 60, 52-56, 70, 62-66 associated with multiple purpose groups 72-76, wherein each purpose group 72-76 includes a respective primary row item 40, 60, 70.

In the sorted table 78, the primary row items 40, 60, 70, i.e., primary objects, have been positioned at the top portions of their respective sorted groups 72-76. Secondary data 42-46, 52-56, 62-66 is positioned below each respective primary object 40, 60, 70 and sorted according to second sort rule (e.g., alphabetical), which may be the default sort rule for the table 78. For illustrative purposes, each purpose group section 72-76 is provided with a corresponding purpose-group label 38, 58, 68, respectively. Purpose group labels may be omitted without departing from the scope of the present teachings.

Figure 4:
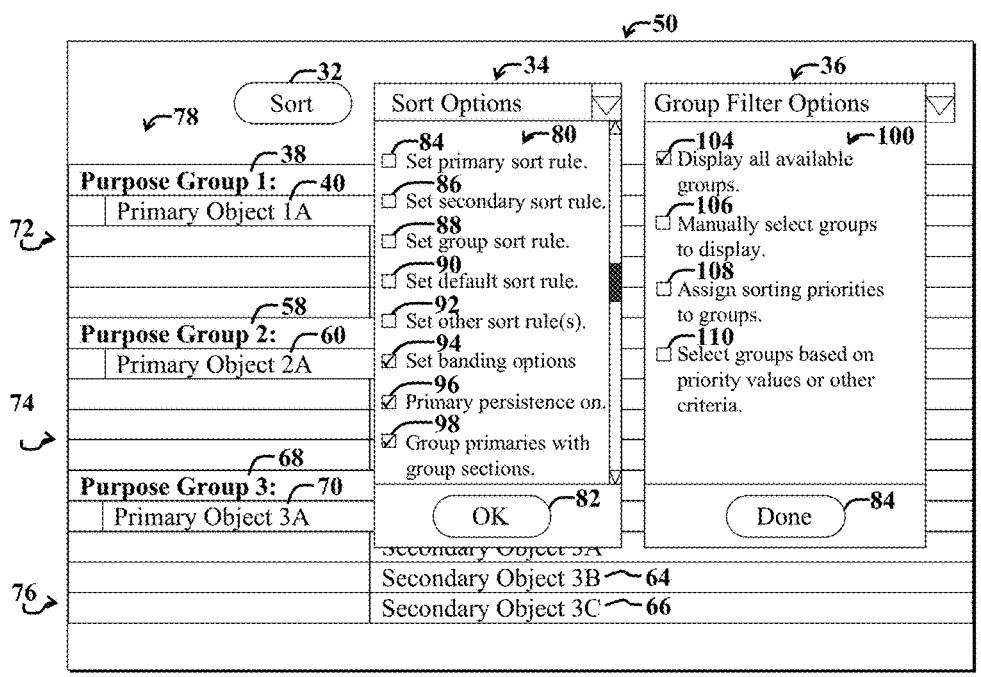
FIG. 4 is a diagram illustrating the user interface display screen of FIG. 3 with drop-down lists activated and showing example sort options and example group filter options.

FIG. 4 is a diagram illustrating the user interface display screen 50 of FIG. 3 with drop-down lists 34, 36 activated and showing example sort options 80 and example group filter options 100. The example sort options 80 and filter options 100 and associated user interface controls are merely illustrative, and more, fewer, and/or different types of user interface controls and options may be provided without departing from the scope of the present teachings.

In the present example embodiment, the sort options 80 include a set-primary-sort-rule checkbox 84, a secondary-sort-rule checkbox 86, a set group-sort-rule checkbox 88, a set-default-sort-rule checkbox 88, a set-default-sort-rule checkbox 90, a set-other-sort-rule checkbox 92, a set-banding checkbox 94, a primary-persistence checkbox 96, and a group-primaries checkbox 98, and an OK button 82. In operation, a user may select one or more of the checkboxes 84-98. When certain checkboxes are selected, and the OK button 82 is subsequently selected, another user interface display screen may appear (not shown) to facilitate enabling a user to further specify details of selected options.

For example, in the present operative scenario, the set-banding checkbox 94 is selected, and the checkboxes 96, 98 are checked. If the user selects the OK button 82, then primaries will persist at prominent locations in any sorted table, by virtue of the primary-persistence checkbox 96 being selected. In addition, by virtue of the group-primaries checkbox 98 being selected, primary objects will be positioned in prominent locations (e.g., at the top of the sections for each purpose group) in each section corresponding to a given purpose group. If the group-primaries checkbox 98 were not selected, then primary objects would sort, for example, to the top of a given table, while secondary objects would be sorted and positioned beneath the primary objects. If the primary-persistence checkbox 96 were not selected, then a resulting sort might cause sorting of the primary objects and the secondary objects with the same sort rules, such that the primary objects would not be automatically positioned in prominent locations in the resulting sorted table.

By virtue of the set-banding checkbox 94 being selected, another user interface display screen (e.g., dialog box) may be displayed. The additional user interface display screen may provide, for example, additional options for enabling a user to select background colors, text colors, outline colors, and so on, for rows corresponding to primary objects and secondary objects. An option for applying banding to facilitate visually distinguishing different objects of different purpose groups, e.g., different sections of the table corresponding to different purpose group lists, may be provided. Hence, banding, highlighting, or other visually distinguishing mechanisms may be used to facilitate distinguishing one or more primary database objects from secondary database objects and/or to facilitate distinguishing data belonging to different purpose groups.

Similarly, if the set-primary-sort-rule checkbox 84 is selected, a subsequent dialog box may appear with additional options for specifying how primary objects are to be sorted relative to each other. For example, the additional options may enable a user to specify that primary objects are to be sorted alphabetically relative to each other.

If the set-secondary-sort-rule checkbox 86 is selected, then a subsequent additional user interface display screen may provide additional options for setting secondary sort rules. For example, the secondary sort rules may specify that secondary data be sorted according to a predetermined priority scheme; by proximity to a given location; alphabetically, or via another sort rule.

If the set-group-sort-rule 88 is selected, an additional user interface display screen may appear that provides additional user options for specifying how different purpose groups will be organized in sections (also called purpose stacks) relative to each other. For example, the additional options may enable a user to cause purpose groups to be organized relative to each other according to a sort rule applied to the accompanying primary objects. Another option, for example, may enable a user to cause purpose groups sections to be organized according to a predetermined priority value assigned to each purpose group.

If the set-default-sort-rule checkbox 90 is selected, then an additional user interface display screen may appear that provides additional user options for specifying a default sort rule for a table. A default sort rule may be a sort rule that applies to only secondary data if the primary-persistence checkbox 96 is selected. The default sort rule may apply to the secondary data when another secondary sort rule is not provided.

If the set-other-sort-rule checkbox 92 is selected, then an additional user interface display screen may appear that provides additional user options to set other sort rules that have not otherwise already been set. For example, additional options may be provided that enable a user to specify multiple sort criteria for different types of data based on predetermined priorities assigned to multiple different types of data. Another example option might enable a user to change the location in a table that is considered to be a prominent location. For example, if the prominent location is set as the bottom most portion of a table, then subsequent sorting may cause primary objects to appear at the bottom of the table.

Note that if several of the check boxes 84-98 are selected, then the subsequently displayed dialog box (displayed after selection of the OK button 82) may include user interface controls, e.g., fields, checkboxes, and so on, for adjusting settings and/or other options corresponding to each of the selected check boxes 84-98.

The example group filter options 36 include a display-all-available-groups checkbox 104, a manually-select-groups checkbox 106, an assign-sorting-priorities checkbox 108, and a select-groups-based-on-other-criteria checkbox 110, and a done button 84. When one or more of the checkboxes 104-110 is selected, and the done button 84 is subsequently selected, an additional user interface display screen (not shown) may appear that provides additional user options.

In the present example operative scenario, the display-all-available-groups checkbox 104 is selected. In this case, no additional user interface display screen needs to be displayed in response to subsequent selection of the done button 84. In this case, all purpose groups and accompanying objects that are available for display in a table will be shown in the table.

If the manually-select-groups checkbox 106 is selected, then an additional user interface display screen may appear that provides additional user options to specify which of the purpose groups and accompanying objects that are available to display will be shown in a subsequently displayed table. For example, the table 78 displayed via the user interface display screen 50 may be adjusted to only display the first purpose group 72. In this case, the resulting table 78 may look similar to the table 48 of FIG. 2.

If the assign-sorting-priorities checkbox 108 is selected, then an additional user interface display screen may provide additional options for assigning priority values to each available purpose group. The assigned priority values may be used to affect how the purpose groups are ordered relative to each other in a resulting sorted table. The group sorting rules may override certain sort rules for sorting primary objects, other than the primary sort rule that causes primary objects to be displayed in a predetermined most prominent table location.

If the select-groups-based-on-other-criteria checkbox 110 is selected, then a subsequent user interface display screen may provide additional user options enabling a user to select for display, for example, purpose groups having a priority value above a predetermined level.

Hence, the present embodiment may provide various user options, including group filter options 100 and sort options 80. A user may have the option to split sort methods among primary objects and secondary objects; to selectively omit purpose groups from a subsequently displayed table; to toggle on and off persistence of primaries in a sorted table; to group primaries in a section at top of table or at top of sections of the table pertaining to each purpose group; to selectively display data from multiple purpose groups in a table along with primary items and secondary items; to selectively sort the primary items and the secondary items in accordance with one or more sorting rules; to apply a first sorting rule to primary objects and a second sorting rule to the secondary objects, wherein the first sorting rule and the second sorting rule are implemented in response to user selection of a sort button; to specify that primary objects not be sorted according to the second sort rule and be positioned above secondary data of the same purpose group; to specify that secondary objects be sorted according to one or more predetermined default table sorting methods (e.g., alphabetical), and so on.

FIG. 5 is a diagram of a third example user interface display screen 120 showing a third sorted table 128, where a purpose-group filter has been applied. In the present example, the purpose-group filter, which has been selected via the group-filter-options drop-down list 36, has effectively filtered out display of the second purpose group 74 of FIG. 3.

FIG. 6 is a diagram of a fourth example user interface display screen 130 showing a fourth sorted table 138, where primary row items, i.e., secondary objects 40, 60, 70, are positioned at an uppermost portion 132 of the table 138. Secondary objects 42-46, 52-56, 62-66 are positioned in a second table portion (also called section) 134 below the first portion 132. The primary objects 40, 60, 70 in the first table portion 132 are sorted according to a first sort rule(s), and the secondary objects 42-46, 52-56, 62-66 in the second section 134 are sorted according to a second sort rule(s).

FIG. 7 is a diagram of a fifth example user interface display screen 140 showing a fifth sorted table 148, which includes a primary row object 40, secondary row objects 42-46, and tertiary row objects 142, 144, 152, 154 associated with a purpose group (labeled 38) and sub-purpose groups, including a first sub-group 164 (labeled 148) and a second sub-group 166 (labeled 158).

In the example table 158, primary row items (e.g., primary object 40) may be sorted according with a first sort rule; secondary row items 42-46 may be sorted according to a second sort rule; and tertiary row items 142, 144, 152, 154 may be sorted according to a third sort rule. In the present embodiment, secondary objects 42-46 are displayed in more prominent locations in the table 158 (e.g., higher up in the table 158) than tertiary objects 142, 144, 152, 154, and the primary object 40 is displayed most prominently relative to other objects. Hence, secondary data is sorted and positioned below primary data; tertiary data is sorted and positioned below associated secondary data.

In the present embodiment, the sort-options drop-down list 34 may include one or more additional options to enable a user to toggle persistence for primary objects and for secondary primary objects. The secondary objects 44, 46 may be considered to be secondary primary objects, since they represent primary objects of the sub-purpose groups 164, 166, respectively. In an example operative scenario, when sorting persistence for a secondary primary is toggled off or otherwise turned off, then subsequent sorting of the table 158 may cause the secondary objects 44, 46 to be sorted along with the secondary objects 42, 44, using the secondary sort rule instead of a tertiary sort rule. Alternatively, toggling off of sorting persistence for secondary objects may cause the third sort rule (also called tertiary sorting rule) to apply to the secondary objects 42, 44 and the sub-objects 142, 144, 152, 154, instead of the second sort rule being applied to the secondary objects 42, 44 and the sub-objects 142, 144, 152, 154. The exact behavior is implementation specific and may be determined by those skilled in the art with access to the present teachings to meet the needs of a given application without undue experimentation. Furthermore, the second sort rule and the third sort rule may be similar. For example, secondary sort and tertiary sort rules may be the standard default sort rule (e.g., alphabetical) for a table.

In summary, with reference to FIGS. 1-7, certain embodiments have been discussed herein for facilitating display and sorting of prioritized data (e.g., primary data corresponding to primary objects, secondary data corresponding to secondary objects, and tertiary data corresponding to tertiary objects) to facilitate enabling users to rapidly locate and identify high priority data in a sorted table.

Figure 8:
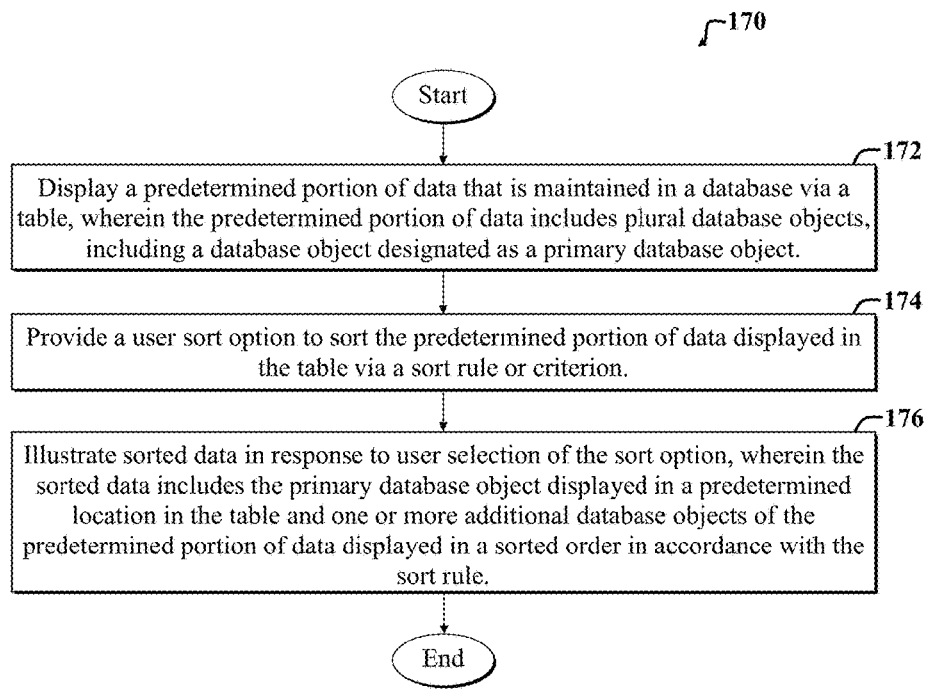
FIG. 8 is a flow diagram of a first example method adapted for use with the embodiments of FIGS. 1-7.

FIG. 8 is a flow diagram of a first example method 170 adapted for use with the embodiments of FIGS. 1-7. The method 170 includes an initial displaying step 172, which involves displaying a predetermined portion of data that is maintained in a database via a table, wherein the predetermined portion of data includes plural database objects, including a database object that is designated as a primary database object.

A subsequent providing step 174 includes providing a user sort option to sort the predetermined portion of data displayed in the table via a sort rule or criterion. In the present embodiment, the sort rule or criterion may represent a default table sorting rule and may apply to all secondary objects included among the predetermined portion of data.

Next, an illustrating step 176 includes illustrating sorted data in response to user selection of the sort option. The sorted data includes the primary database object displayed in a predetermined prominent location in the table. The sorted data further includes one or more additional database objects, e.g., secondary database objects, of the predetermined portion of data, which are displayed in a sorted order in accordance with the sort criterion.

Note that the method 170 may be modified or augmented without departing from the scope of the present teachings. For example, the sort rule may further include an additional sort rule that is applied to primary database objects. The additional sort rule may specify that primary database objects be moved to one or more predetermined prominent locations in the table e.g., the top section of the table or the top row of each purpose group section or list associated with each primary object. The additional sort rule may further specify, for example, that primary database objects be sorted relative to each other based on a predetermined context, e.g., alphabetically.

Figure 9:
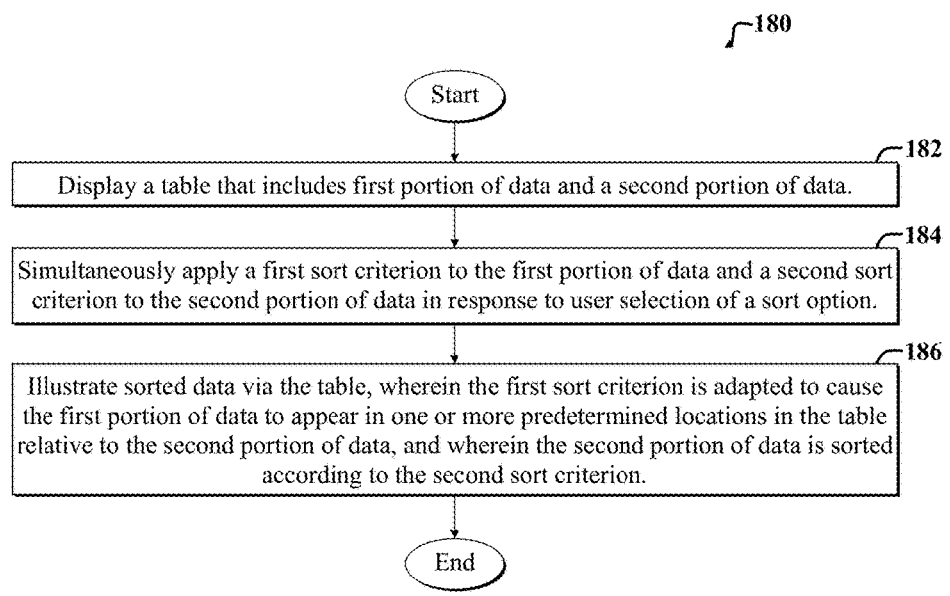
FIG. 9 is a flow diagram of a second example method adapted for use with the embodiments of FIGS. 1-7.

FIG. 9 is a flow diagram of a second example method 180 adapted for use with the embodiments of FIGS. 1-7. The second method includes a first step 182, which involves displaying data in a database table, wherein the data includes first portion of data and a second portion of data. The first portion of data may include primary data comprising primary database objects. The second portion of data may include secondary data comprising secondary and/or tertiary database objects.

Subsequently, a second step 184 includes simultaneously applying a first sort criterion or rule to the first portion of data and a second sort criterion or rule to the second portion of data in response to user selection of a sort option. Note that a given sort rule or criterion may include plural sub-rules or criterion. For example, a first sort criterion that specifies that primary data be moved to a top section of a table may further include a rule that specifies that primary database objects be arranged alphabetically relative to each other.

Next, a third step 186 includes illustrating sorted data via the table. In response to sorting, the first sort rule is adapted to cause the first portion of data to appear in one or more predetermined locations in the table relative to the second portion of data. The second portion of data is sorted according to the second sort criterion.

In the present embodiment, the first sort rule is characterized by a higher sorting priority than the second sort rule, such that data that is subject to the first sort rule is not subject to the second sort rule. In addition, display of data that has been sorted via the second sort rule may be positioned in the table in accordance with both the first sort rule and the second sort rule.

Figure 10:
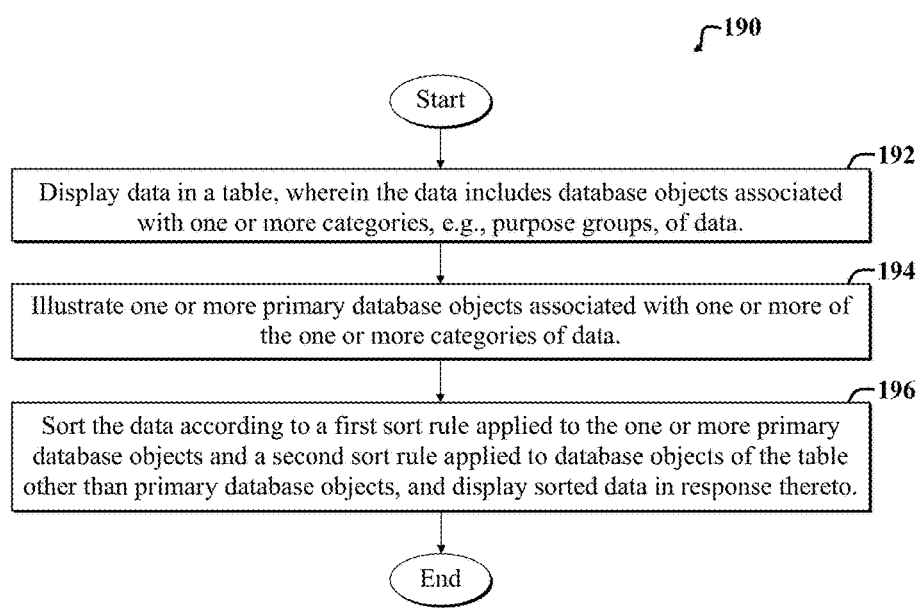
FIG. 10 is a flow diagram of a third example method adapted for use with the embodiments of FIGS. 1-7.

FIG. 10 is a flow diagram of a third example method 190 adapted for use with the embodiments of FIGS. 1-7. The method 190 includes an initial displaying step 192, which involves displaying data in a table, wherein the data includes database objects that are associated with one or more categories, e.g., purpose groups, of data.

A second illustrating step 194 includes illustrating one or more primary database objects associated with one or more of the one or more categories of data.

Next, a final sorting step 196 includes sorting the data according to a first sort rule applied to the one or more primary database objects and a second sort rule applied to database objects of the table other than primary database objects, and display sorted data in response thereto.

FIG. 11 is a diagram of a sixth example user interface display screen 200 illustrating an example use case involving a table 218 of contacts with contact objects arranged in rows. The user interface display screen 200 includes a table toolbar 212 with various user interface controls, called icons, button icons, or butcons. A menu bar 210 includes actions, view, and format menus.

The table 218 includes a primary column 202 on the far left, which is adjacent to a name column 204, which is adjacent to a primary-phone column 206, which is adjacent to a title column 208. Objects of the title column 208 represent various roles associated with a given object, e.g., purchasing manager, purchaser, head purchaser, and so on. The roles may be used to group objects and sort objects similar to how purpose groups are grouped and sorted, without departing from the scope of the present teachings.

A primary object, which corresponds to the first row (also called the uppermost or topmost row) of the table 218, includes a checkmark 214, which acts as a primary object identifier, also called the primary-status icon. The primary-status icon 214 indicates a primary row (object) in a table. For illustrative purposes, a mouse cursor 216 is shown positioned in a field containing the checkmark 214 and activating a hover indicator 220 (also called a tooltip text box) identifying the checked row as a primary contact. The hover indicator 220 exhibits bubble-help behavior, such that when a cursor hovers over a particular object or indicator, text may appear describing the object or component.

A user may delete the primary assignment of an object, such as by selecting the associated row, e.g., the first row indicated by the checkmark 214, and then deleting the contact. Furthermore, a primary assignment may be removed or reassigned via one or more user options provided by the menu bar 210 and/or the table toolbar 212.

In general, when a user deletes a primary object, the assignment is also deleted. If a primary object is required, an error message may be displayed prior to the deletion of a primary object or prior to the removal of the last primary assignment. An error-message dialog box (also simply called dialog) may request the user to first select a new primary assignment from an object list prior to attempting the delete object or assignment.

In the present example embodiment, the primary column 202 is located immediately adjacent to a closely related object-type column, such as the name column 204. The primary column 202 is preferably placed in the first column position, i.e., the left-most column for left-to-right reading and the right-most column for right-to-left reading in localized interfaces.

The primary column 202 is titled "Primary" in a table column header. However, this aspect, as well as other aspects, may be altered without departing from the scope of the present teachings. For example, the "Primary" label could be replaced with "Master," "Default," "Preferred," and so on.

To set an object as a primary object, the object, e.g., row, may be selected via the mouse cursor 216, and then a set-primary butcon 222 may be selected. Other methods or additional methods may be employed to implement a primary assignment without departing from the scope of the present teachings. Hence, the set-primary butcon 222 is a toolbar butcon whose selection assigns primary status to a selected row in the table 218, resulting in the appearance of a checkmark in the selected row. The set-primary butcon 222 may be implemented in accordance with RCU (Running Repository Creation Utility) usage guidelines.

The user interface display screen 200 is merely illustrative, and various modifications may be made. For example, while not shown in FIG. 11, the table 218 may be titled via a table header that establishes a context for the types of objects, e.g., purchasing contacts, included in the table. Tables with other types of objects, such as addresses, employees, and so on, may be titled accordingly.

Figure 12:
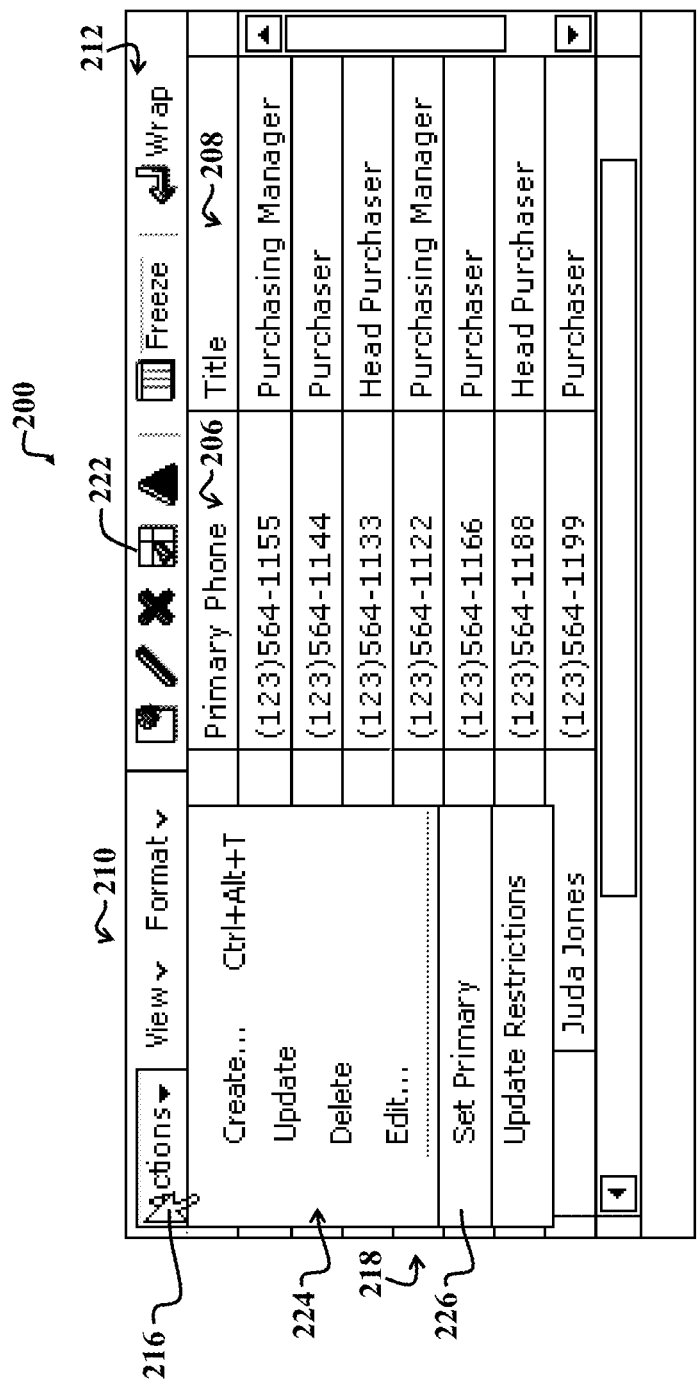
FIG. 12 is a diagram showing an activated actions menu of the sixth example user interface display screen of FIG. 11.

FIG. 12 is a diagram showing an activated actions menu 224 of the sixth example user interface display screen 200 of FIG. 11. The actions menu 224 includes various user options for manipulating selected table objects, including an option to create, update, delete, edit, set primary 226, and an option to update restrictions. Upon selection of the set-primary option 226, a selected object will be marked with a checkbox, such as the checkbox 214 of FIG. 11.

If the selected row is currently the primary object, or multiple rows have been selected due to multi-select being turned on for the table, then selection of the set-primary option 226 will appear disabled in the actions menu 224. For any other selected row, selection of the set-primary option 226 will mark the row as a primary object via a checkbox. While checkboxes are employed in various embodiments disclosed herein to indicate a primary object, other types of markings or indicators may be employed without departing from the scope of the present teachings.

If only one purpose group is shown, and an option to set only one primary object per purpose group is selected, then selecting a row that is not a primary object, and then selecting the set-primary butcon 222 or selecting the set-primary menu option 226 will cause reassignment of the primary status to the newly selected row. A confirmation dialog box may appear confirming any changes. If the table 218 is currently sorted by primary, i.e., the primary object(s) is set to appear at the top of the table 218, then the new primary selection should move to the top row and the previous checkmark should disappear.

In accordance with an example table sorting behavior, when the user selects the header (labeled "Primary") of the primary column 202, the table 218 will sort the rows, i.e., objects of the table 218, resulting in the current primary object appearing in the top row of the table 218. Subsequent object rows inherit any previously set table sorting order or a default table sorting order. Primary, secondary, tertiary sorting is allowed on any column without any restriction. By default, the table 218 will execute a secondary sort on the most closely related object specified in any object type or purpose group column, as discussed more fully below.

Figure 13:
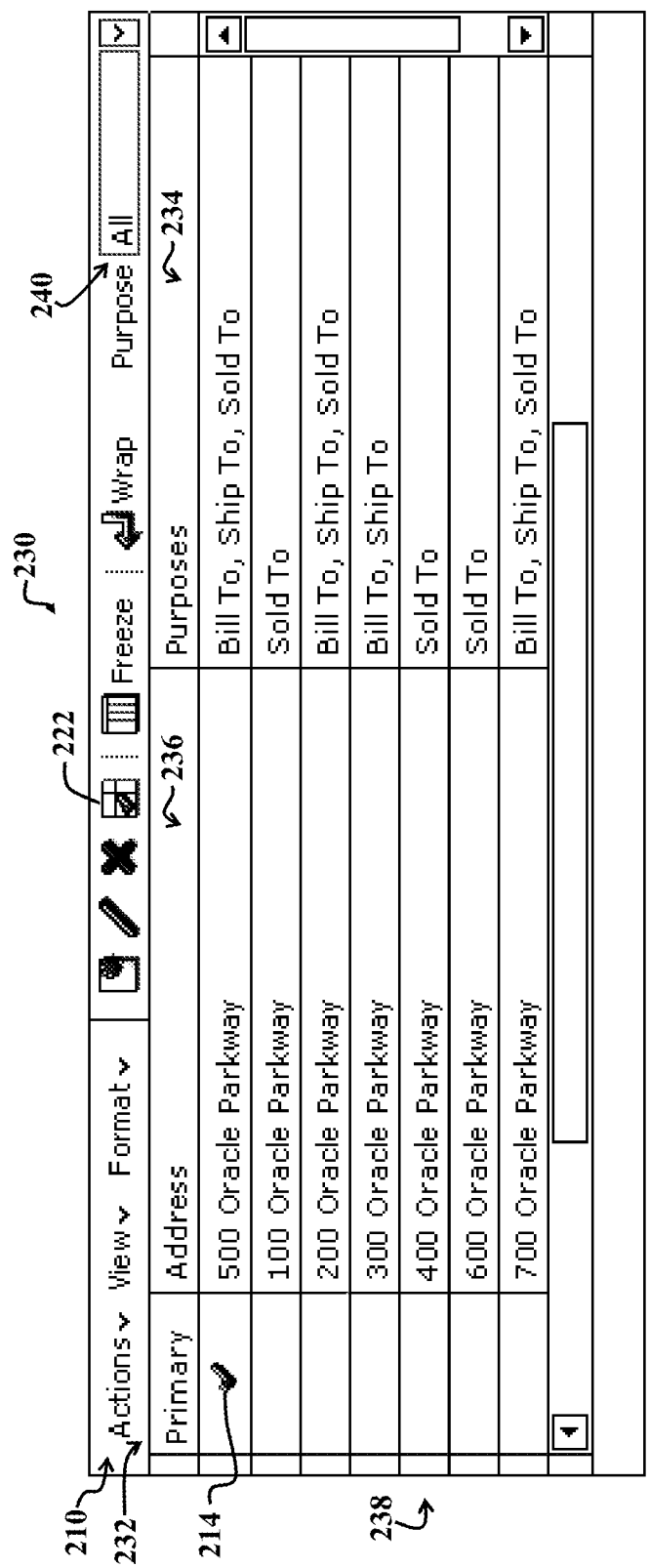
FIG. 13 is a diagram of a seventh example user interface display screen illustrating an example use case involving a table with bill-to and ship-to addresses, where a purpose filter has been set to display all bill-to and ship-to contact addresses.

FIG. 13 is a diagram of a seventh example user interface display screen 230 illustrating an example use case involving a table 238 of bill-to and ship-to addresses, where a purpose filter 240 has been set to display all contact addresses.

The table 238 includes a left-most primary column 232, which is adjacent to an address column 246, which is adjacent to a purpose column 234. Various addresses of the address column 236 are part of one or more purpose groups, as indicated in the purpose column 234. The example purpose groups include bill-to, ship-to, and sold-to purpose groups. The primary object, as indicated by the checkmark 214 is shown as the top-most row of the table 238 and is associated with an address of 500 Oracle Parkway and three purpose groups; in particular bill-to, ship-to, and sold-to purpose groups.

The purpose-group filter 240 is set to "all," such that all objects of all purpose groups of the table 238 are displayed in the table 238. The purpose-group filter 240 includes various additional options for affecting which objects are displayed in the table 238, as discussed more fully below. In the present example embodiment, the purpose column 234 is displayed as the last column of the table 238.

When the table 238 is sorted, e.g., by address, the primary object, identified by the checkmark 214 appears as the top row of the table 238. Subsequent rows inherit a previously established or default table sorting order.

Figure 14:
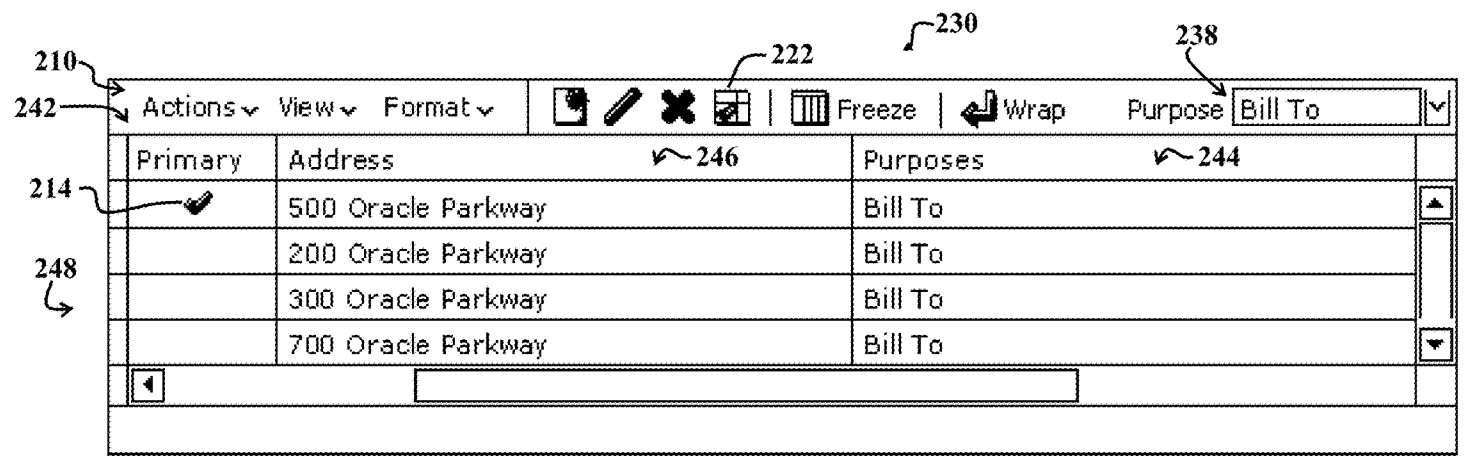

FIG. 14 is a diagram showing the seventh example user interface display screen 230 of FIG. 13 after the purpose filter 238 has been set to display only bill-to addresses. A resulting table 248 shows objects belonging to a bill-to purpose group, as indicated in an updated purpose column 244. Objects of the bill-to purpose group have been moved to the top of the table 248. Additional objects of different purpose groups may be displayed by scrolling. Alternatively, the additional objects are omitted from the table 248, such that addresses that are not associated with a bill-to purpose group are not displayed. After table sorting, the primary object, indicated by the checkmark 214, remains in the upper-most row of the table 248.

When a primary object row contains multiple purposes separated by commas, all purpose values may either persist in the purposes column cell, or disappear, in accordance with the product requirements. The exact behavior is implementation specific and may vary.

Figure 15:
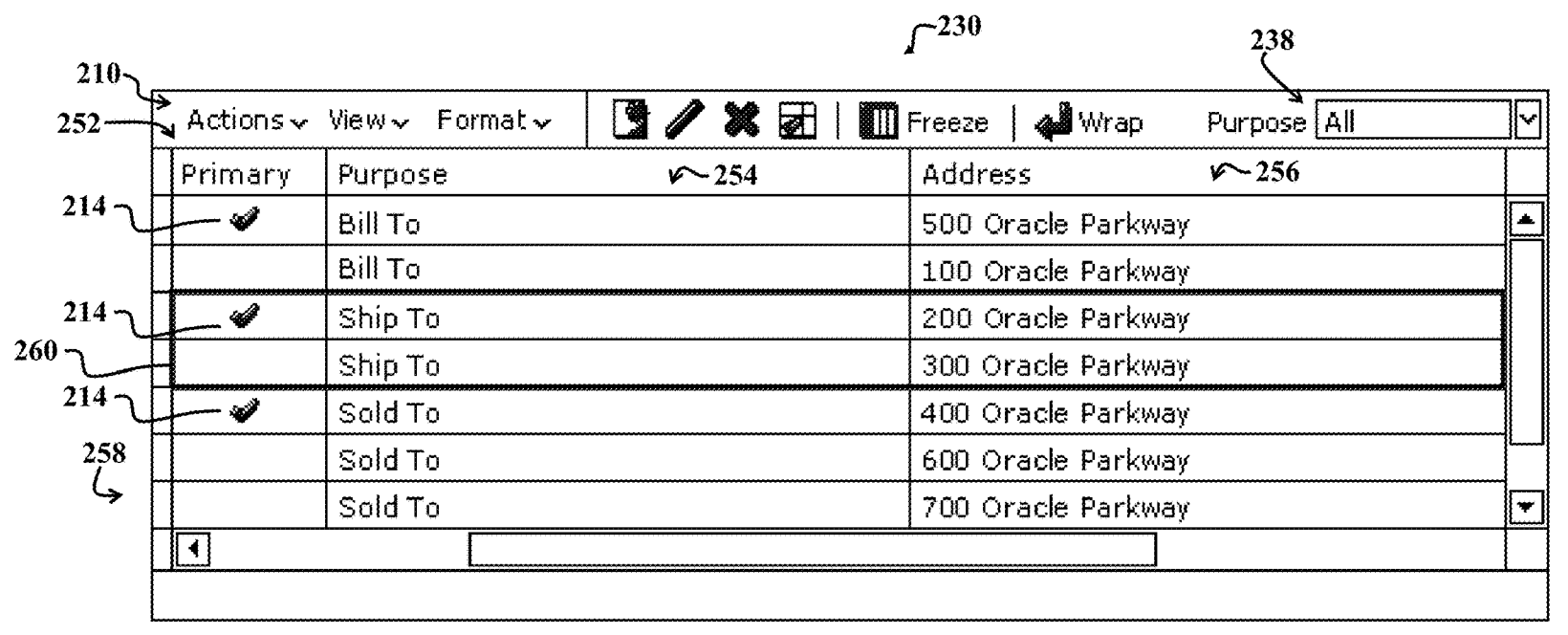

FIG. 15 is a diagram showing the seventh example user interface display screen 230 of FIG. 13 after additional primary objects have been set, as indicated by checkmarks 214. The resulting table 258 includes table rows, which have been arranged into sorted purpose groups The table 258 is called a by-purpose table, which may be any table with objects that are arranged or displayed in groups identified in a column, e.g., a purpose-group column 254. In the present example embodiment, different purpose-group sections or lists are differentiated via banding. Banding may be implemented via adjustment to row-background color, or other mechanisms, such as highlighting, as shown by the purpose-group outline 260.

The purpose group filter 238 has been set to display data pertaining to all purpose groups. After sorting, primary objects appear at the top rows of their respective purpose-group sections, with other objects being sorted and displayed according to a previously set or default table sorting criterion, i.e., rule.

Depending on the functional complexity of an underlying primary-object-type data model, there may be multiple listed purposes that support multiple primary designations for users to assign. For example, an object "address" may have multiple listed addresses and multiple listed purposes assigned to any one of the different addresses. Addresses may have primary ship-to, bill-to, copy-to, and so on, addresses.

In the present example embodiment, only one primary object is allocated for a given purpose group, such that only one primary assignment exists for each object type and purpose combination. The primary column 252 is displayed as the first column, and the by-purpose column 254 is positioned immediately to the right, i.e., in the second column of the table 258.

Each purpose, e.g., bill-to, ship-to, sold-to, and so on, has one of the respective addresses listed as the primary object for that particular purpose. Secondary, tertiary, and so on, sorting may be allowed on any column without any restriction. By default, the table 258 executes a primary sort on purpose, a secondary sort on the primary, and a tertiary sort on the third column of the table. Any time an end-user selects a different column to sort on, the table will always prefix that request with a primary sort on the purpose column 254.

Other user-interface features and controls may be provided in the user interface display screen 230 without departing from the scope of the present teachings. For example, a header may be provided with the name of the table 258.

FIG. 16 is a diagram illustrating the seventh example user interface display screen 230 of FIG. 15 after selection of a ship-to purpose filter 238. After selection of the ship-to filter 238, only objects associated with the ship-to purpose group, as identified in a purpose column 264 are displayed in the resulting table 268 along with corresponding addresses, which are displayed in an associated address column 266.

FIG. 17 is a diagram of an eighth example user interface display screen 270 illustrating an alternative mechanism 274 for setting a primary object. The alternative mechanism 274 represents a user interface control for implementing a primary assignment in a dialog box that shows detailed information 272 pertaining to a particular object. In the present example embodiment, the object pertains to a "Center for Disease Control" customer.

Other mechanisms for implementing primary assignments may be employed without departing from the scope of the present teachings. For example, the user interface control 274 may be replaced with a radio button; may be an option in a drop-down list, and so on.

The default checkbox setting for the user interface control 274 is set to off, i.e., empty. When primary is set in a table for an object, the corresponding dialog box 270 will display a checked-on status in the checkbox 274. Similarly, when a primary is set in a form, the corresponding object will display with a checkmark in a table.

The checkbox 274 will default to a checked-on status if a primary assignment has not been previously set for a different object in the same purpose group type category. Alternatively, a confirmation warning is also display when the user de-selects a primary checkbox when no other objects of a particular purpose group have been designed as primary.

For the purposes of the present discussion, a form may be any listed group of objects and/or attribute types that together create a grouped common party object category, e.g., customers contact details. In a form, the set-primary selection component, i.e., user interface control 274 may be located adjacent to the corresponding attribute or grouped type.

Note that while the user interface display screen 270 shows a single "Primary Contact," many primary objects may be displayed via a single record or dialog box. In such an implementation, additional check boxes (in addition to the check box 274) may be provided for selecting, for example, primary billing contact and primary shipping contact.

While embodiments have been discussed wherein with reference to displaying and sorting data in a database table that includes primary and secondary data, embodiments are not limited thereto. For example, any set of data may be partitioned into different groups with different priority values assigned to the different groups. Different sort rules may be specified and simultaneously applied to the data so that data belonging to different groups is automatically sorted according to the associated sort rule, which may be adjusted according to priority values assigned to the different groups of data.

Any suitable programming language can be used to implement the routines of particular embodiments including C, C++, Java, assembly language, and so on. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium storing instructions which, when executed by one or more processors, cause the one or more processors to perform operations comprising:

sorting a plurality of object groups, each object group thereof including a separate primary object, by respective primary objects of those object groups;

determining a plurality of prominent locations within a table;

displaying a control;

in response to detecting user input that activates the control, organizing the table according to a first arrangement in which the object groups are placed in order of the sorting relative to a prominent location selected from the plurality of prominent locations, and in which each object group's primary object is placed at a top of an object group to which that primary object belongs, wherein the object group and the object group's primary object are positioned to accentuate that the object group is subordinate to the primary object;

displaying the table organized according to the first arrangement;

in response to detecting user input that deactivates the control, organizing the table according to a second arrangement in which each of the object groups' primary objects are placed at the prominent location in order of the sorting, and in which all non-primary objects of the object groups are placed in a visual position indicative of a subordinate position relative to a lowest-placed primary object in the table, wherein the non-primary objects for the object groups are placed in visual groupings that correspond to the order of the sorting to maintain a hierarchy of the object groups correlated to a hierarchy of the primary objects; and displaying the table organized according to the second arrangement.

2. The computer-readable storage medium of claim 1, wherein sorting the plurality of object groups comprises sorting the plurality of object groups according to a first sorting rule.

3. The computer-readable storage medium of claim 1, wherein sorting the plurality of object groups comprises sorting the non-primary objects according to a second sorting rule.

4. The computer-readable storage medium of claim 1, further comprising another control for selecting the separate primary object associated with each of the plurality of object groups.

5. The computer-readable storage medium of claim 1, further comprising another control for establishing a persistent location for the primary objects.

6. The computer-readable storage medium of claim 1, wherein the first arrangement varies according to a location placement of the object groups within the table.

7. The computer-readable storage medium of claim 1, further comprising in response to the sorting, positioning each of the object group's primary object to a predominant location within the table.

8. The computer-readable storage medium of claim 1, further providing a group filter option configured to selectively filter out one or more of the plurality of object groups.

9. The computer-readable storage medium of claim 1, wherein the order of sorting comprises applying a first sorting rule to the primary object groups and a second sorting rule to at least some of the non-primary objects.

10. The computer-readable storage medium of claim 1, wherein the order of sorting comprises applying a first sorting rule to the primary object groups according to a location of the primary object groups within the table.

11. The computer-readable storage medium of claim 1, wherein the second arrangement comprises sorting each of the object groups according to a first sorting rule and sorting all of the non-primary objects according to a second sorting rule.

12. The computer-readable storage medium of claim 1, further comprising in response to detecting user input that activates another control, organizing the table according to a third arrangement in which each of the object groups' primary objects are placed at bottom position of the table in order of the sorting, and in which all non-primary objects of the object groups are placed above a highest-placed primary object in the table.

13. The computer-readable storage medium of claim 1, further comprising in response to detecting user input positioning the plurality of object groups within the table, organizing the table according to a third arrangement in which each of the object groups' primary objects are placed at a user defined prominent position.

14. The computer-readable storage medium of claim 1, further comprising in response to detecting user input positioning the plurality of object groups within the table, organizing the table according to a third arrangement in which relative positions of each of the object groups' primary objects and the non-primary objects vary in response to the positioning the plurality of object groups within the table.

15. The computer-readable storage medium of claim 1, further comprising in response to detecting user input positioning the plurality of object groups within the table, organizing the table according to a third arrangement in which each of the object groups' primary objects predominance relative to the non-primary objects varies automatically with the positioning of the plurality of object groups.

16. The computer-readable storage medium of claim 1, further comprising in response to detecting user input to filter the object groups, filtering the object groups to remove at least some of the filtered object groups from the table.

17. The computer-readable storage medium of claim 1, further comprising selectively applying banding to the object groups to distinguish primary objects from non-primary objects.

18. A computer implemented method for selectively sorting and displaying data, the method comprising:
  sorting a plurality of object groups, each object group thereof including a separate primary object, by respective primary objects of those object groups;
  determining a plurality of prominent locations within a table;
  displaying a control;
  in response to detecting user input that activates the control, organizing the table according to a first arrangement in which the object groups are placed in order of the sorting relative to a prominent location selected from the plurality of prominent locations, and in which each object group's primary object is placed at a top of an object group to which that primary object belongs, wherein the object group and the object group's primary object are positioned to accentuate that the object group is subordinate to the primary object;
  displaying the table organized according to the first arrangement;
  in response to detecting user input that deactivates the control, organizing the table according to a second arrangement in which each of the object groups' primary objects are placed at the prominent location in order of the sorting, and in which all non-primary objects of the object groups are placed in a visual position indicative of a subordinate position relative to a lowest-placed primary object in the table, wherein the non-primary objects for the object groups are placed in visual groupings that correspond to the order of the sorting to maintain a hierarchy of the object groups correlated to a hierarchy of the primary objects; and
  displaying the table organized according to the second arrangement.

19. A system comprising:
  a digital processor coupled to a display screen and to a processor-readable storage device, wherein the processor-readable storage device includes one or more instructions executable by the digital processor to perform the following acts:
  sorting a plurality of object groups, each object group thereof including a separate primary object, by respective primary objects of those object groups;
  determining a plurality of prominent locations within a table;
  displaying a control;
  in response to detecting user input that activates the control, organizing the table according to a first arrangement in which the object groups are placed in order of the sorting relative to a prominent location selected from the plurality of prominent locations, and in which each object group's primary object is placed at a top of an object group to which that primary object belongs, wherein the object group and the object group's primary object are positioned to accentuate that the object group is subordinate to the primary object;
  displaying the table organized according to the first arrangement;
  in response to detecting user input that deactivates the control, organizing the table according to a second arrangement in which each of the object groups' primary objects are placed at the prominent location in order of the sorting, and in which all non-primary objects of the object groups are placed in a visual position indicative of a subordinate position relative to a lowest-placed primary object in the table, wherein the non-primary objects for the object groups are placed in visual groupings that correspond to the order of the sorting to maintain a hierarchy of the object groups correlated to a hierarchy of the primary objects; and
  displaying the table organized according to the second arrangement.

* * * * *

UNITED STATES PATENT AND TRADEMARK OFFICE
CERTIFICATE OF CORRECTION

PATENT NO. : 10,146,821 B2
APPLICATION NO. : 14/968806
DATED : December 4, 2018
INVENTOR(S) : Boross et al.

Page 1 of 1

It is certified that error appears in the above-identified patent and that said Letters Patent is hereby corrected as shown below:

In the Specification

In Column 1, Line 13, delete "specification:" and insert -- specification. --, therefor.

In Column 13, Line 36, delete "butcons." and insert -- buttons. --, therefor.

In Column 14, Line 21, delete "butcon" and insert -- button --, therefor.

In Column 14, Line 24, delete "butcon" and insert -- button --, therefor.

In Column 14, Line 25, delete "butcon" and insert -- button --, therefor.

In Column 14, Line 27, delete "butcon" and insert -- button --, therefor.

In Column 14, Line 58, delete "butcon" and insert -- button --, therefor.

In Column 15, Line 59, delete "groups" and insert -- groups. --, therefor.

Signed and Sealed this
Twenty-sixth Day of November, 2019

Andrei Iancu
*Director of the United States Patent and Trademark Office*